Nov. 21, 1961    E. J. HOUDRY    3,009,513
TREATMENT OF WASTE GAS STREAMS
Filed Dec. 24, 1956    2 Sheets-Sheet 1

INVENTOR.
EUGENE J. HOUDRY
BY
ATTORNEY

Nov. 21, 1961     E. J. HOUDRY     3,009,513
TREATMENT OF WASTE GAS STREAMS
Filed Dec. 24, 1956     2 Sheets-Sheet 2
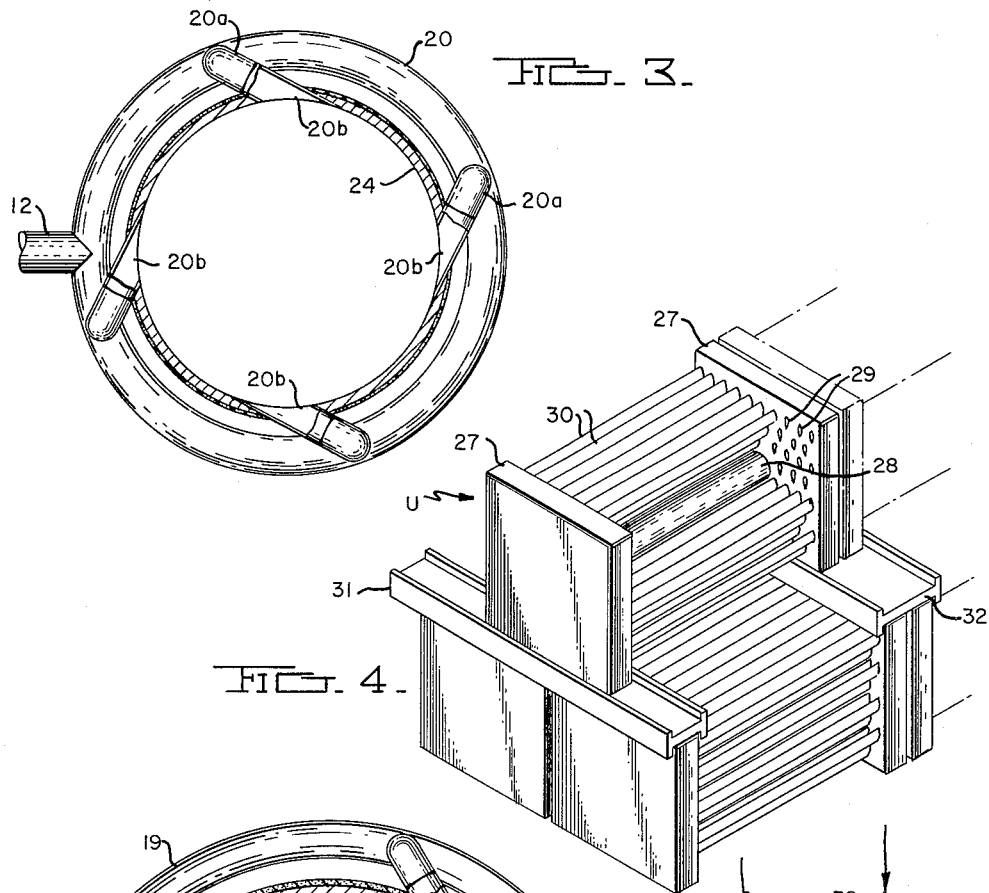
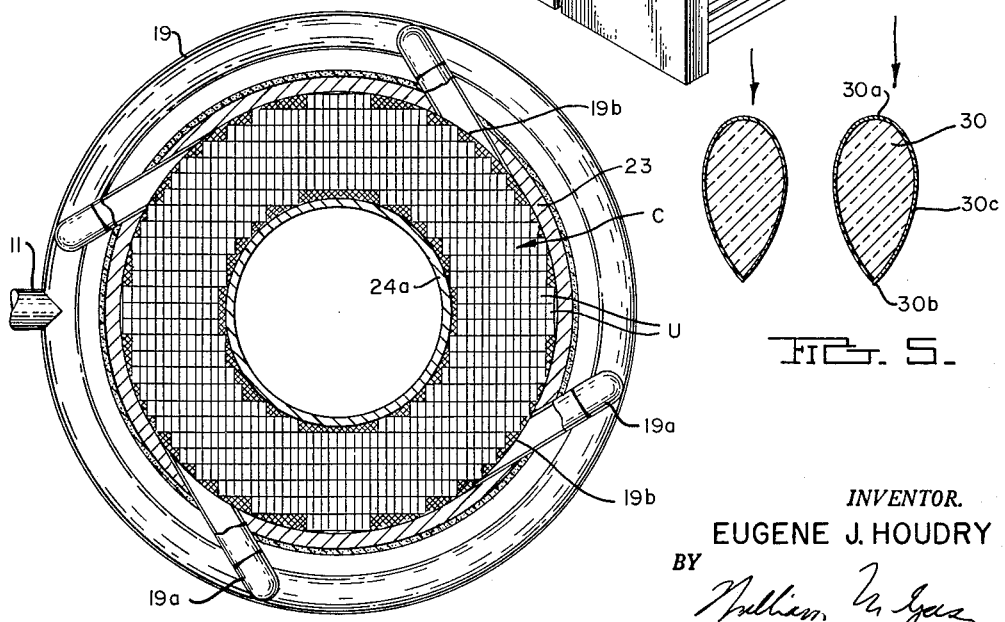
*INVENTOR.*
EUGENE J. HOUDRY
BY
ATTORNEY United States Patent Office 3,009,513
Patented Nov. 21, 1961

3,009,513
TREATMENT OF WASTE GAS STREAMS
Eugene J. Houdry, Ardmore, Pa., assignor to Oxy-Catalyst, Inc., a corporation of Pennsylvania
Filed Dec. 24, 1956, Ser. No. 630,192
14 Claims. (Cl. 158—117.5)

This invention relates to an improved method for the combustion of waste gas streams, and is particularly concerned with the combustion of dilute carbon monoxide-containing waste gas streams from catalyst regenerator kilns of catalytic cracking units employed in petroleum refining, making possible efficient heat recovery therefrom.

Waste gases from industrial processes often contain appreciable concentrations of combustible materials, such as 4% to 8% carbon monoxide, but are nevertheless too lean in combustible material to propagate a flame under normal conditions. Such waste gas streams may contain very substantial amounts of chemical heat, which if released by oxidation of the combustible material in the stream, could be employed for useful purposes, such as the generation of steam. For example, there are many industrial waste gas streams having a chemical heat content of from 5 B.t.u. to 35 B.t.u. per cubic foot in which the quantities of waste gas involved are of the order of tens or hundreds of thousands of standard cubic feet per minute. Such streams accordingly are capable of furnishing large quantities of heat energy provided the energy content of these gases can be released and then recovered in a practicable and economic fashion.

The chief difficulty in recovering useful heat from such waste gas streams is that their auto-oxidation temperature is usually substantially higher than the temperature at which the stream is available. The "auto-oxidation temperature" of a gas mixture, as used herein, refers to that temperature at which the gas mixture, containing sufficient oxygen to provide for complete oxidation of the combustible content, will propagate a flame. Ordinary fuel gas-air mixtures which contain a relatively rich concentration of combustibles will of course ignite and propagate a flame at ambient temperatures. However, mixtures which are relatively lean in combustibles, such as a stream containing from 4% to 8% carbon monoxide, must be heated to relatively high temperatures such as temperatures ranging from 1200° F. to 1500° F. before they will ignite and burn with flame propagation. At the temperatures at which these streams are usually available, e.g. 500° F. to 1000° F., they accordingly will not propagate a flame, although upon release of their latent heat content the resultant temperature (under adiabatic conditions) will lie substantially above their auto-oxidation temperature. For example, a stream containing 5% carbon monoxide and sufficient oxygen with slight excess to oxidize this CO content, the remainder being $CO_2$ and $N_2$ has an auto-oxidation temperature of the order of 1300° F. If available at 800° F., it will not propagate a flame. Release of its chemical heat content by oxidation of the CO without the addition of outside heat will increase its temperature by 750° F. such that it would reach a final temperature of 1550° F., substantially above its auto-oxidation temperature.

There are two methods employed at the present time for oxidizing the combustible content of such gas streams, thus making possible the utilization of their latent heat content. According to one of these methods, the entire stream is passed through a bed of oxidation catalyst, the catalyst serving to promote the oxidation of the combustible content of the stream at entering temperatures substantially less than the auto-oxidation temperature of the stream. For example, the gas mentioned above containing 5% carbon monoxide and having an auto-oxidation temperature of the order of 1300° F., may be oxidized by passing it in contact with a bed of oxidation catalyst, such for example as a platinum on activated alumina catalyst, at an entering temperature of 800° F. In the presence of the catalyst, oxidation of the CO will take place and this exothermic reaction will produce a temperature rise (assuming adiabatic conditions) in the gas stream of approximately 750° F. with the result that the exit temperature from the catalyst will be approximately 1550° F.

There are several disadvantages, however, in employing catalysts in this manner. Since the volume of the dilute waste gas stream is relatively great, passage of the entire stream through the bed of catalyst requires the use of a large amount of catalyst, and since efficient, durable oxidation catalysts capable of operating at high temperature levels are relatively expensive, the cost of the heat recovery installation is correspondingly high. A second disadvantage of the use of catalysts in this manner is the fact that even with the best available catalyst the maximum catalyst operating temperature at which long catalyst life can be expected is approximately 1700° F., which in turn restricts the maximum temperature at which the oxidized gases can be delivered to the heat recovery system. This, of course, imposes a limit on the efficiency with which a heat recovery system may be operated since the efficiency of heat recovery increases at increasing temperature level of the gases delivered to the system. This maximum temperature limitation may in some cases, where the gas stream is relatively rich in combustibles, require that the waste gas stream be diluted with excess air or with catalyzed gases recycled from the heat recovery system in order to restrict the exit temperature from the catalyst to the maximum permissible.

The other method presently employed for oxidizing the combustible content of such waste gas streams is to heat the stream to its auto-oxidation temperature whereupon it will undergo flame combustion. This is ordinarily accomplished by burning auxiliary fuel in the presence of the waste gas stream, the hot combustion products from the burning of the auxiliary fuel serving to bring the mixture above the auto-oxidation temperature of the waste gas. For example, the waste gas stream previously mentioned containing 5% carbon monoxide may be ignited by heating it to its auto-oxidation temperature of approximately 1300° F. When heated to this temperature the mixture undergoes flame combustion and the heat thereupon released will serve to raise the temperature of the mixture (assuming adiabatic conditions) to approximately 2050° F.

This method, although avoiding the use of catalyst, is itself subject to several disadvantages. In many cases, a substantial amount of auxiliary fuel must be burned in order to raise the temperature of the mixture to the auto-oxidation temperature of the waste gas. For example, the gas stream mentioned above containing 5% CO has a latent heat content of approximately 16 B.t.u. per cubic foot. If this gas is available at 800° F., in order to release this latent heat, it is necessary to add to the waste gas an additional 9 B.t.u. per cubic foot by burning auxiliary fuel. Thus approximately .56 B.t.u. must be added to the waste gas by way of auxiliary fuel for each B.t.u. released through the oxidation of the combustible content of the waste gas stream. The use of substantial amounts of auxiliary fuel in this manner is often undesirable in that such fuel can usually be utilized more efficiently in an ordinary boiler or other heat recovery system than it can be when so employed to increase the temperature of the waste gas stream. In addition, the burning of substantial amounts of auxiliary fuel substantially increases the size of the heat recovery installation required.

The object of the present invention is to provide an improved method free from the disadvantages mentioned above, for burning combustible containing waste gas streams having auto-oxidation temperatures substantially higher than the temperature of the stream, but having a combustible content sufficient when oxidized to raise the temperature of the stream substantially above its auto-oxidation temperature.

A particular object of the invention is to provide such a method applicable to waste gas streams produced during catalyst regeneration in catalytic cracking operations in petroleum refining.

According to the invention, such a waste gas stream is first divided into a plurality of streams. One of these streams, preferably comprising a minor proportion of the total, is delivered into a first combustion zone and therein the stream is treated so as to effect oxidation of its combustible content and thus increase its temperature substantially above its auto-oxidation temperature. The treatment of the stream to effect oxidation of its combustibles content in the first combustion zone is accomplished preferably by passing the stream in contact with an oxidation catalyst which will operate to oxidize the combustible content at entering temperatures substantially below its auto-oxidation temperature. After such oxidation of its combustibles content the resultant temperature of the stream leaving the catalyst bed will be substantially above its auto-oxidation temperature. A second less preferred method of effecting oxidation of the combustible content of the stream in the first combustion zone is simply to heat the stream to its auto-oxidation temperature preferably by burning of an auxiliary fuel, whereupon the mixture will propagate a flame and burn by flame combustion.

In either case, the thus heated stream from the first combustion zone is then passed successively through a plurality of additional combustion zones. In each of these additional zones an additional stream of the original waste gas is added to the stream from the first zone and, in each of these subsequent zones, the proportions of the newly added cool waste gas to the relatively high temperature gas entering from the preceding combustion zone is so adjusted that the temperature of the mixture in each of the zones before oxidation of the combustible content of the newly added stream lies above the auto-oxidation temperature of the mixture, whereby oxidation of the combustible content of the newly added stream takes place by flame combustion raising the temperature of the mixture again substantially above its auto-oxidation temperature before the mixture passes into the next successive zone.

As will appear more in detail from the following description of specific embodiments of the invention, the advantages gained from operating according to the above procedure are the use of only a fraction of the amount of catalyst otherwise required when, according to the preferred embodiment, a bed of catalyst is employed in the first combustion zone; or, when auxiliary fuel is employed in the first combustion zone, the use of only a fraction of the auxiliary fuel otherwise required. These advantages flow from the fact that only a fraction of the total stream is delivered to the first combustion zone, the remainder being oxidized without the use of catalysts or auxiliary fuel. A further advantage results from the fact that even when catalysts are employed the temperature of the stream delivered to the heat recovery system is not limited by the maximum operating temperature of the catalyst. A still further advantage is that when catalysts are employed in the first combustion zone, the size of the heat recovery system may be tailored to serve only for the recovery of the heat in the waste gas stream; while in the case of the use of auxiliary fuel in the first combustion zone, only a small increase in size of the heat recovery system is necessary to take care of the heat generated by the combustion of the small amount of auxiliary fuel.

As stated previously, the invention is particularly applicable to waste gas streams emanating from catalyst regeneration kilns of petroleum catalytic cracking units. In the catalytic cracking of heavy hydrocarbons such as found in crude petroleum to produce lighter materials in the gasoline range, the usually employed silica-alumina catalyst becomes fouled with a carbonaceous deposit which is periodically burned off to restore cracking activity. The burn-off of this material, usually termed "regeneration" of the catalyst, must be conducted at relatively low temperatures of from 900° F. to 1150° F. to avoid thermal damage to the catalyst. To accomplish this, air is passed over the catalyst and the catalyst temperature in the so-called "regeneration kiln" is controlled by heat exchange surfaces disposed in the catalyst bed. At such combustion temperatures the flue gas from the kiln contains substantial amounts of carbon monoxide as well as small amounts of hydrocarbon gases, such as methane, and in some cases small amounts of heavy oil vapor.

The carbon monoxide content of such "regeneration kiln" flue gases ranges broadly between 2% and 12% by volume and more usually between 3% and 10%. The content of hydrocarbons, both gaseous and in the form of oil vapors is equivalent in heat content to from 0.15 to 1.5 barrels per day of oil per thousand barrels per day of oil charged to the cracking unit. These combustible constituents result in a gas having a B.t.u. content per cubic foot (after addition of the air necessary to supply the oxygen required for complete oxidation of these constituents) ranging broadly from 5 to 35 B.t.u./ft.$^3$ and more usually from 8 to 25 B.t.u./ft.$^3$.

The temperature of such streams at the exit from the regeneration kiln generally lies in the range of from 900° F. to 1150° F. After the addition of the air at ambient temperature required to furnish the oxygen for the oxidation of the combustible constituents, the air-gas mixture temperature ranges from 725° F. to 925° F.

Such gas-air mixtures have auto-oxidation temperatures ranging from 1250° F. to 1450° F., substantially above the temperatures at which they are available, and consequently will not ignite and burn with flame combustion at their available temperatures.

Reference is now made to the drawings showing a system for carrying out the invention.

FIG. 2 is a cross-sectional view taken on the line 2—2 of FIG. 1;

FIG. 3 is a cross-sectional view taken on the line 3—3 of FIG. 1;

FIG. 4 is a perspective view of a type of catalytic unit particularly suitable for carrying out the invention; and FIG. 5 is a cross-section of two of the catalytic elements employed in the units illustrated in FIG. 4.

Figure 1:
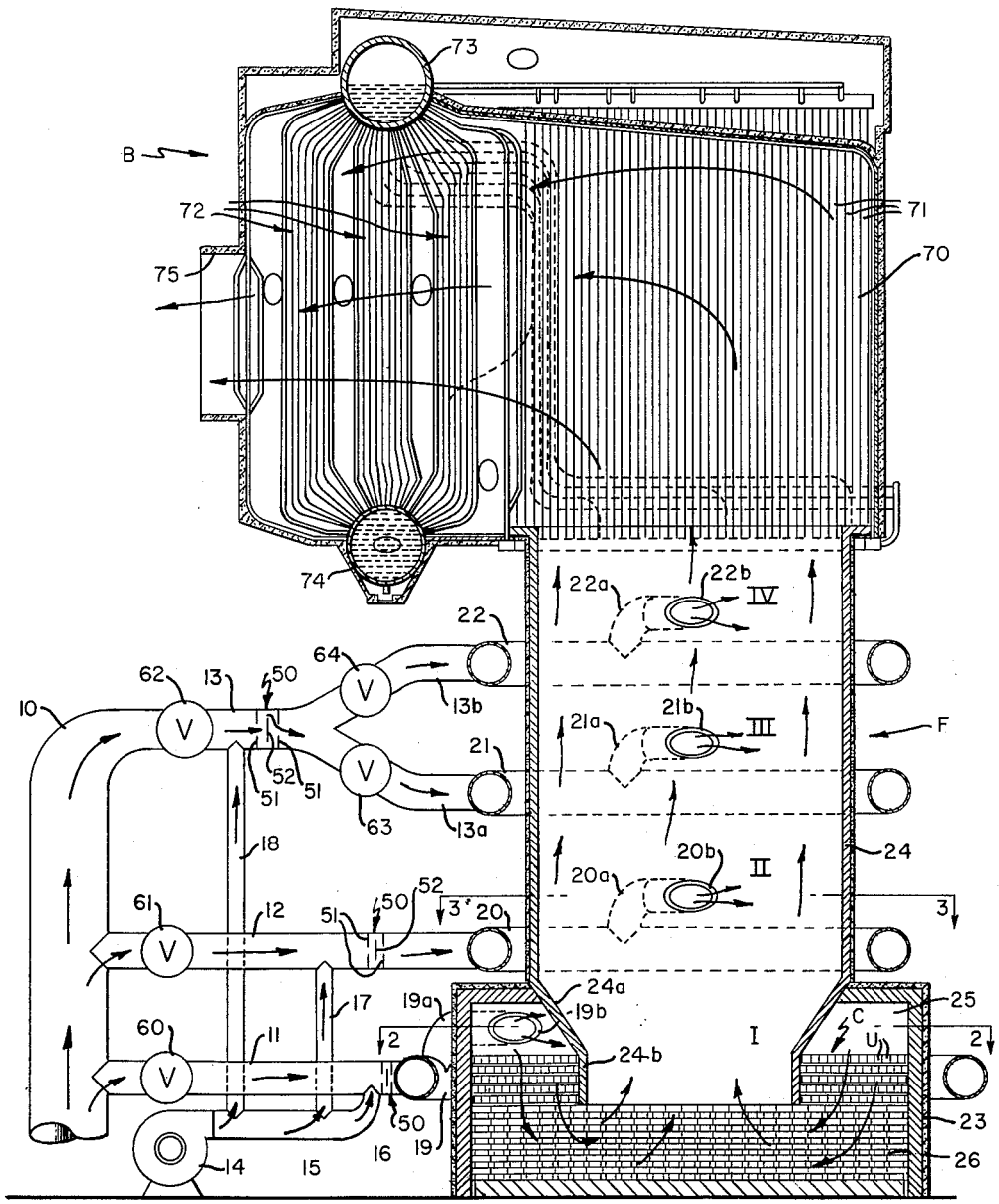
FIG. 1 is a cross-sectional view of a furnace and associated boiler for burning waste gas streams in accordance with the invention and for recovering the heat produced.

Referring now to FIG. 1, the reference letter F refers generally to a furnace having four combustion zones designated by the numerals I to IV. The reference letter B refers generally to a boiler for recovering heat from the hot gases generated in the furnace F.

A waste gas stream, containing for example 6% carbon monoxide by volume, and substantially no oxygen, is introduced into the system through line 10 which serves as a distributing header for branch lines 11, 12 and 13, controlled respectively by valves 60, 61, and 62. An air blower 14, or an air compressor if the furnace is operated under pressure, supplies air to branch lines 11, 12 and 13 through a header 15 and branch air lines 16, 17, and 18 respectively. Branch line 13 is itself split into two lines 13a and 13b controlled respectively by valves 63 and 64. Line 11 delivers an air-gas mixture into zone I of the furnace through a circular header 19 which is connected by elbows 19a to a series of tangential admission ports 19b (see FIG. 2). Line 12 delivers an air-gas mixture into zone II of the furnace through a circular header 20 which is connected by elbows 20a to a series of tangential admission ports 20b (see FIG. 3). Line 13a delivers a gas-air mixture into zone III of the furnace through a circular header 21 which is connected by elbows 21a to tangential admission ports 21b while line 13b delivers a similar mixture into zone IV of the furnace through a circular header 22 which is connected by elbows 22a to a series of tangential admission ports 22b.

In order to insure good mixing of the air and waste gas, a mixing device designated generally by the reference numeral 50 is provided in each of lines 11, 12 and 13. The mixing device 50 comprises a pair of orifice plates 51 between which a deflecting baffle 52 is located. The sudden contraction and expansion of the gases and the changes of direction with resulting turbulence experienced by the gases as they flow through devices 50 results in thorough mixing of the air and waste gas before the mixture flows into the furnace. Such mixing is of great importance from the standpoint of insuring combustion of the gas mixture at the lowest temperature. It is understood of course that other types of mixing devices may be employed, the device shown being by way of illustration.

In the embodiment shown, the furnace is vertical in structure, combustion zone I being located at the bottom of the furnace with the remaining combustion zones superimposed. The bottom portion of the furnace comprising zone I has a refractory lining 23. The upper portion of the furnace comprising zones II, III and IV is provided with a refractory lining 24. As may be seen, refractory lining 24 of the upper portion of the furnace extends downwardly into zone I in a conical downwardly converging section 24a and a contiguous cylindrical section 24b.

The annular space between conical section 24a and refractory lining 23 forms an annular chamber 25 into which the catalyst gas-air mixture is delivered through tangential inlet ports 19b.

In the annular space betwen cylindrical section 24b and refractory lining 23 of the lower portion of the furnace, an annular bed of oxidation catalyst designated generally by the reference letter C is disposed. For the purpose of supporting this annular catalyst bed an annularly-shaped checker brickwork assembly 26 is disposed at the bottom of the furnace. Gases from inlet ports 19b flow into annular space 25, thence through the annular catalyst bed C and thence through checker brickwork assembly 26 and then upwardly into zone II of the furnace as indicated by the arrows.

The catalyst bed C is made up of a plurality of catalytic units designated generally by the reference letter U. Several of these units and the manner in which they are assembled in the bed are shown in perspective in FIG. 4 of the drawings to which attention is now directed.

Each of the units U is made up of a pair of end plates 27 which are maintained in spaced apart relationship by means of a centrally located post 28 to either end of which end plates 27 are fastened. Each of the end plates is provided with a plurality of apertures 29 to receive the ends of a plurality of rod-like elements 30 which are thus supported between the two ends plates. At least one end of the rods 30 is supported freely in its aperture in such maner that the rod is free to undergo thermal expansion and contraction independently of the end plates 27. The rods 30 are arranged in a plurality of rows, the rods in each alternate row being arranged in staggered relationship to rods in adjacent rows so as, in this way, to insure efficient gas to surface contact as the gas stream to be catalyzed flows over the surfaces of the rods. As may be seen best in FIG. 5, which shows a cross-sectional view of a pair of the rod-like elements 30, these elements are streamlined in cross-section for the purpose of reducing turbulence as gases flow through the unit. The direction of gas flow is shown by the arrows, and as may be seen, the leading edge 30a of the rod is rounded in cross-section with a tapered trailing edge 30b.

Each of the rods 30 is provided with a thin film 30c of catalytic material providing an active oxidation catalyst. Each of the rods 30 accordingly provide a catalytic surface exposed to the flow of gases passing through the units U.

For use in the process of the invention, the units U are preferably composed of a high quality porcelain capable of withstanding temperatures of the order of at least 2000° F. The catalytic film is preferably of the type described in U.S. Patent No. 2,742,437 comprised of a thin film preferably ranging from .001″ to .006″ in thickness and comprised of a catalyticaly active form of an oxide such as alumina, beryllia, thoria or magnesia and impregnated with a catalytically active metal such as platinum, palladium, copper or the like. A particularly active and durable catalyst is provided by a .003″ thick film of activated alumina impregnated with about 1% by weight (based on the weight of the alumina film) of finely divided platinum.

As may be seen in FIG. 4, the units U are stacked upon one another in a plurality of layers to form the catalyst bed, the units in each layer being arranged side-by-side and end-to-end. To provide a more stable assembly, U-shaped channel members 31 and 32 are disposed between each superimposed layer of units, these channels fitting over the end plates in the layer below and receiving the end plates in the layer above, thus maintaining the end plates in alignment and preventing displacement in the assembly. At the end of the catalytic bed a channel member 31 accommodating a single end plate is employed, while in the central portion of the bed a channel member 32 accommodating two end plates is employed, thus tying end-to-end rows of the units together in back-to-back relationship. A more complete description of such a catalytic assembly is given in U.S. Patent No. 2,718,460.

The units U and their arrangement as shown to make up a catalyst bed are highly advantageous for practicing the invention since a catalyst bed thus constructed offers little pressure resistance to the flow of gases. This results from the spaced apart relationship of the catalytic rods and is aided by their streamlined configuration. Typical spacing for the side-by-side rods may range for example from 0.1 to 0.3 inches between the surfaces of adjacent rods. This oriented arrangement of the catalyst surface permitting free passage of the gases through the catalyst bed also avoids the problem of the bed acting as a filter for solid particles with which waste gas streams are often laden. Conventional pellet or granular type catalyst beds in many cases would quickly plug up from the dustload in the waste gas.

While the type of catalyst described above, both with respect to its physical configuration and chemical composition, is particularly suitable for practicing the invention, it is to be understood that the invention is not limited to any particular configuration or catalyst composition. Other catalyst configurations and compositions capable of operating over substantial periods of time at relatively high temperatures and providing pressure drops through the catalyst bed within practical limits may be employed in the practice of the invention.

The heat recovery section of the system illustrated comprises a conventional steam boiler B arranged above a furnace F. The gases from the furnace flow first into a chamber 70 provided with water tubes 71. The chamber 70 serves also as a secondary combustion chamber by providing additional combustion space following the furnace. The gases from chamber 70 flow over a plurality of tube banks 72, through breaching 75 and thence to an economizer and/or air heater if desired before passing to the stack. The boiler shown is of the natural circulation type having a steam drum 73 and a water drum 74.

Other types of heat recovery systems than that shown may be employed, a steam boiler being shown by way of illustration.

In the operation of the system, the waste gas entering by line 10 is divided into a plurality of smaller streams, each being introduced separately into a different zone of the furnace by lines 11, 12, 13a and 13b. If sufficient oxygen is present in the waste gas stream initially to supply that required for oxidation of its combustibles content, it is of course unnecessary to add air to the stream. If not, however, sufficient air is added for this purpose preferably before the gas is introduced into the furnace and intimately mixed with the waste gas so that a substantially homogeneous mixture of air and waste gas enters the furnace. Such a procedure is highly preferred over feeding the necessary air into the furnace separate from the waste gas. In such case the mixing of the air and gas must take place in the furnace itself, and the lack of immediate and efficient mixing tends to interfere with the combustion of the waste gas with the net result that higher furnace temperatures are required before complete combustion will take place.

The necessary air may be added either at ambient temperature or preheated, depending upon the temperature of the waste gas stream, and other factors. It may be added separately to each of the separate streams into which the main stream is divided as shown in FIG. 1, or alternatively, all the air required may be mixed with the entire waste gas stream before it is divided into a plurality of streams for introduction into the furnace. Separate air introduction into each branch line as shown in FIG. 1 permits the proportion of air in each of these lines to be independently controlled.

The separate streams of waste gas containing the oxygen necessary for the oxidation of their combustible content, enter the furnace tangentially through tangentially directed inlet ports as described. The tangential admission of the streams creates turbulent conditions in the furnace thereby insuring rapid mixing as the streams rising from the lower zones blend with the gases admitted in the zones above.

The stream entering zone I flows through catalyst bed C where the combustible content of the waste gases is catalytically oxidized in contact with the catalytic surface afforded by the bed, the heat released by the exothermic oxidation reaction serving to raise the temperature of the gas at the outlet from the catalyst bed above the auto-oxidation temperature of the gas. For example, a gas entering at 1000° F. containing 4% CO and having an auto-oxidation temperature of 1350° F. would be raised to a temperature of 1600° F. through oxidation of the CO.

The gas inlet temperature in zone I must be maintained above the minimum temperature level at which the catalyst will effectively promote the oxidation of the combustible content of the stream. Generally speaking, minimum inlet temperatures above 500° F. and preferably above 700° F. should be maintained. Minimum catalyst inlet temperatures are influinced by the rate of gas flow over the catalyst and the outlet temperature from the catalyst, high gas flows per unit catalyst volume and lower outlet temperatures generally requiring higher inlet temperatures under otherwise equivalent conditions.

The thus heated first zone gas passes upwardly, in the embodiment shown, into zone II of the furnace where it is mixed with gases entering tengentially through ports 20b. The gas entering through ports 20b is substantially below auto-oxidation temperatures and the mixture temperature achieved in zone II before oxidation of the combustibles content of the newly added gas depends upon both the respective entering temperatures of the two gas streams and the proportions in which the two gas streams are mixed. The lower the temperature and the higher the proportion of the newly added gases obviously the lower will be the mixture temperature. On the other hand, the higher the temperature and the higher the proportion of the hot stream from the first zone the higher will be the mixture temperature. The proportions of the two streams are controlled in relation to their respective temperatures so that the mixture temperature in zone II is at least as great as the auto-oxidation temperature of the mixture. Under these conditions, the combustible content of the newly added gas undergoes flame combustion, liberating its chemical heat content and again raising the temperature of the mixture substantially above the auto-oxidation temperature. Control of the proportions of the gases introduced into each zone may be effected by regulation of valves 60, 61, 62, 63 and 64.

The hot gases from the second zone pass upwardly in the furnace and mix with the relatively cool gases introduced into the third zone by means of inlet ports 21b. Here again, the proportion of the hot gases rising from zone II to the relatively cool gases introduced into zone III is controlled such that the mixture temperature in zone III before oxidation of the combustible content of the newly added gases is above the auto-oxidation temperature of the mixture. Under these conditions the combustible content of the newly added gases burns by flame combustion and the hot mixture passes upwardly into zone IV where the same process is repeated. The hot gases pass finally into the water-walled chamber 70 above the furnace proper and over the heat exchange surfaces of the boiler, as previously described.

The choice of the number of zones to be employed and the proportion of gases to be introduced into each zone depends upon the avialable temperature of the waste gas stream and its composition. In general, the lower the available temperature of the waste gas and the leaner its concentration of combustibles, the higher will be the number of zones that will be required, other things being equal. This follows from the fact that where the waste gas is lean and low in temperature less gas may be added in each zone without lowering the mixture temperature below auto-oxidation temperatures.

The number of zones required is likewise largely dependent upon the proportion of waste gas introduced into the first zone. It is advantageous to limit the proportion of gas introduced into the first zone since thereby the amount of oxidation catalyst required is correspondingly reduced. On the other hand, the smaller the amount of gas employed in the first zone, the smaller will be the amount of gas that can be mixed with it in the second and successive zones without excessively lowering the mixture temperature, with the result that a larger number of zones will be required to handle all of the gas. In the majority of cases, in balancing these considerations it will be found desirable to introduce into the first zone a proportion of the total waste gas stream ranging from about 20% to 45%.

In the second zone the amount of gas that can be introduced, at a given combustibles concentration in the waste gas, depends not only on the proportion of the total gas introduced into the first zone but also upon the exit temperature from the first zone. Under equivalent conditions, the amount of gas that may be introduced into the second zone is directly proportional to the amount by which the exit temperature of the first zone gases exceeds the auto-oxidation temperaure of the second zone mixture. For example, if the auto-oxidation temperature in the second zone is 1400° F., twice as much gas may be added in the second zone with a first zone exit temperature of 1600° F. than when the first zone exit temperature is 1500° F. This follows from the fact that under equivalent conditions twice as much cool gas is required to lower the mixture temperature from 1600° F. to 1400° F. as is required to lower it from 1500° F. to 1400° F. Consequently, to limit the number of zones, it is desirable to maintain the exit temperature from the catalyst in zone I at the highest possible level compatible with the maximum catalyst operating temperature at which it will retain its activity over a reasonable period of time. Such maximum temperatures for catalyst of the type described are of the order of 1700° F.

In some cases, where the available temperature of the waste gas is relatively high, or where the combustible concentration is high, or where both conditions exist simultaneously, special steps may be required to prevent the catalyst exit temperature from exceeding its permissible operating limit. A preferred method for accomplishing this is to dilute that portion of the waste gas entering zone I with excess air, preferably at ambient temperatures, thus reducing the total temperature rise in the first zone. By virtue of the excess air introduced into zone I, the air otherwise required in subsequent zones may be reduced correspondingly since the gases emanating from zone I will contain excess oxygen to supply a portion of the oxygen requirements in the subsequent zones.

From the foregoing it is apparent that after having established that proportion of gas introduced into the first zone and the exit temperature from the first zone, the proportion that may be introduced into the second zone may be readily determined. In succeeding zones an increasing proportion of waste gas may be introduced since the total mass of gas increases with each succeeding zone permitting correspondingly greater dilutions with cooler gas. For example, in a typical case, the proportion of the total waste gas stream introduced into the first zone may be 30% while the remainder of the gas is introduced into four additional zones in increasing proportion with respect to the total gas, such as 10% in the second zone, 15% in the third, 20% in the fourth and the remaining 25% in the fifth.

*Example*

A waste gas from the regeneration kiln of a "fluid bed" catalytic unit having the following average composition temperature and flow rate may be treated in accordance with the invention by the following procedure:

$CO_2$ _____ 9.6%.
CO _____ 7.0%.
$O_2$ _____ 1.4%.
$H_2O$ _____ 9.0%.
$N_2$ _____ 73.0%.
Temperature ____ 990° F.
Flow rate_____ 15,400 lbs./minute (equivalent to 206,000 standard cubic feet per minute).

This gas stream is first mixed with 4000 lbs./minute of air (approximately 56,000 s.c.f.m.) at ambient temperature (average 60° F.) to produce a mixture having a flow rate of 19,400 lbs./min. (262,000 s.c.f.m.) at a temperature of 790° F. The chemical heat content of the mixture is 240 B.t.u./lb. (18.2 B.t.u./s.c.f.m). This mixture is divided into five separate streams and separately introduced into a furnace of the type shown in the drawings having five superimposed combustion zones having a total volume of 12,000 cubic feet and a horizontal cross-sectional area of 450 square feet. The amount of gas introduced into each zone and the proportion each amount bears to the total stream of 19,400 lbs./minute is as follows:

|  | lbs./min. of gas | Percent of total stream |
|---|---|---|
| Zone I | 7,000 | 36.1 |
| Zone II | 2,100 | 10.8 |
| Zone III | 2,600 | 13.4 |
| Zone IV | 3,300 | 17.0 |
| Zone V | 4,400 | 22.7 |

The gas is introduced tangentially at a velocity at the inlet ports of from 40 to 42 feet per second.

In zone I a bed of oxidation catalyst is disposed comprised of catalytic units of the type shown in FIG. 4. The units employed are composed of high quality porcelain and each unit contains 71 rod-like catalytic elements approximately 6" in length provided with a film 0.003" in thickness of activated alumina impregnated with approximately 1% by weight (based on the weight of the alumina film) of finely divided platinum. Each unit provides a catalytic surface area of approximately 200 sq. in. By employing 13,000 of such units, approximately 18,000 square feet of catalytic area is provided.

Upon entering the catalyst bed at a temperature of 790° F., the carbon monoxide content of the stream is catalytically oxidized and the exothermic heat of reaction results in a catalyst outlet temperature of approximately 1600° F.

The 7000 lb./min. 1600° F. stream from zone I flows into zone II where it is mixed with 2100 lb./min. of waste gas at 790° F. resulting in a mixture temperature of approximately 1420° F. This being above the auto-oxidation temperature of the mixture, the combustible constituents of the newly added stream burn in zone II by flame combustion raising the temperature of the mixture to approximately 1600° F.

The 1600° F. stream from zone II flows at the rate of 9100 lbs./minute into zone III where it is mixed with 2600 lbs./minute of 790° F. waste gas resulting again in a mixture temperature of 1420° F. before oxidation of the combustibles in the newly introduced gases. At this temperature the mixture burns by flame combustion again raising the temperature to 1600° F.

In zone IV, 11,700 lbs./minute of 1600° F. gas from zone III mixes with 3300 lbs./minute of waste gas at 790° F. again resulting in a mixture temperature of 1420° F. and a final temperature of 1600° F. after oxidation of the combustibles content of the newly introduced stream.

In zone V, 15,000 lbs./minute of 1600° F. gas from zone IV mixes with 4400 lbs./minute of 790° F. waste gas resulting again in a mixture temperature of 1420° F. and a final temperature of 1600° F. after oxidation of the combustibles in the newly added gas.

From zone V, 19,400 lbs./minute of 1600° F. gas flows into a suitable heat recovery system such as a steam boiler. In a suitable boiler such a stream may raise for example 330,000 lbs./hour of 600 p.s.i.g. superheated steam at 700° F., thus recovering approximately 389,256,000 B.t.u./hour of the chemical and sensible heat present in the waste gas stream.

In the above example it will be noted that only 36% of the waste gas stream is passed through the catalyst bed. Since the amount of catalyst required is essentially directly proportional to the volume of gas treated by the catalyst, this amounts to a two-thirds reduction in the amount of catalyst necessary compared to a conventional operation in which the total flow is passed through the catalyst. In an installation of the type described the catalyst cost is a substantial proportion of the total initial cost and accordingly a major reduction in the catalyst required substantially reduces the initial cost of the installation. Furthermore, since the catalyst will ordinarily require periodic servicing or replacement, the substantial reduction in the amount of catalyst results in substantial reduction in maintenance costs.

It will be further noted that in the example given no extraneously supplied heat is required, all the heat produced and recovered being derived from the waste gas stream. This is an advantage over conventional operations where extraneous heat is used to raise the temperature of the waste gases to the auto-oxidation point (such heat being ordinarily supplied by burning of auxiliary fuel) in that such auxiliary fuel can be usually more efficiently utilized in conventional boilers or the like.

In the example given for a waste gas containing an average carbon monoxide concentration of 7% before air addition, the maximum temperature in the system is approximately 1600° F. In a similar operation where the gas contains 9% carbon monoxide a maximum temperature of approximately 1750° F. would be employed in the zones following the catalyst, while the zone I temperature containing the catalyst would be held below 1700° F., and preferably no higher than 1600° F. to insure reasonable catalyst life. Similarly, if in the above example the temperature of the air-gas mixture delivered to the furnace was 1000° F. instead of 790° F. a maximum temperature of 1800 F. would be employed in the zones following the catalyst while holding the catalyst zone temperature preferably below 1600° F. Reduction of the maximum temperature in the catalyst zone may be accomplished, as previously mentioned, by adding an excess of diluting air to the gases introduced into this zone. It may thus be seen that the invention permits maximum temperatures well in excess of practical catalyst operating temperatures while at the same time avoiding the use of extraneously supplied heat.

The most advantageous embodiment of the invention involves the use of an oxidation catalyst in the first zone as has been described. However, if desired, instead of employing a catalyst in zone I auxiliary fuel burners may be employed to raise the temperature of the gases above their auto-oxidation temperature. While this requires the use of some extraneously supplied fuel the amount of fuel necessary in contrast to conventional processes is very substantially reduced. For example, if only 36% of the total waste gas is introduced into the first zone as in the example given, only about one-third the amount of extraneous fuel would be required than when the total waste gas stream is heated to its auto-oxidation temperature.

The invention is particularly suitable for the combustion of waste gas streams containing carbon monoxide as the principal combustible constituent, such as the "regeneration gases" from catalytic cracking units. Thus, the invention may be advantageously employed for the combustion of lean blast furnace gases or other such carbon monoxide containing streams. It may also be employed however for streams containing other combustible constituents, such as for the combustion of gases vented from coal mines containing for example from .5% to 3% by volume of gaseous hydrocarbons in air ordinarily comprising principally methane. Likewise, effluent gases from carbon black manufacture by the partial oxidation of hydrocarbons containing substantial amounts of carbon monoxide, hydrogen and hydrocarbons may also be treated in accordance with the invention for recovery of their waste heat content.

It is understood that the above examples are given by way of illustration and that the invention is not limited thereby nor in any way except by the scope of the appended claims.

I claim:

1. A method for burning a combustibles-containing waste gas stream having an auto-oxidation temperature substantially higher than the temperature of said stream and having a combustible content sufficient when oxidized to raise the temperature of said stream substantially above said auto-oxidation temperature, comprising the steps of dividing said waste gas into a plurality of streams, passing the first of said streams into a first combustion zone and therein treating said stream so as to effect oxidation of its combustible content and thus increase its temperature substantially above said auto-oxidation temperature, passing the thus heated first stream successively through a plurality of additional combustion zones, successively adding to said first stream in each additional combustion zone an additional stream of said waste gas, and adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

2. A method in accordance with claim 1 in which said first stream comprises from 20% to 45% of the total stream.

3. A method for burning a combustibles-containing waste gas stream having an auto-oxidation temperature substantially higher than the temperature of said stream and having a combustibles content sufficient when oxidized to raise the temperature of said stream substantially above said auto-oxidation temperature, comprising the steps of dividing said waste gas into a plurality of streams, passing the first of said streams comprising from 20% to 45% of the total stream into a first combustion zone and therein treating said stream so as to effect oxidation of its combustible content and thus increase its temperature substantially above said auto-oxidation temperature, passing the thus heated first stream successively through a plurality of additional combustion zones, successively adding to said first stream in each of said additional combustion zones an additional stream of said waste gas, progressively increasing the proportion of waste gas added in each successive zone while at the same time adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

4. A method for burning a combustibles-containing waste gas stream having an auto-oxidation temperature substantially higher than the temperature of said stream and having a combustible content sufficient when oxidized to raise the temperature of said stream substantially above said auto-oxidation temperature, said stream containing an insufficient concentration of oxygen for oxidation of the combustible content thereof, comprising the steps of dividing said waste gas into a plurality of streams and passing said streams into a plurality of combustion zones, homogeneously mixing sufficient primary air with said waste gas before introducing thereof into said combustion zones to supply the oxygen required for oxidation of said combustibles, passing the first of said streams into a first combustion zone and therein treating said stream so as to effect oxidation of its combustible content and thus increase its temperature substantially above said auto-oxidation temperature, passing the thus heated first stream successively through a plurality of additional combustion zones, successively adding to said first stream in each additional combustion zone an additional stream of said waste gas, and adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

5. A method in accordance with claim 1 in which the combustible content of said waste gas is comprised principally of carbon monoxide.

6. A method in accordance with claim 1 in which said waste gas comprises effluent gas resulting from the regeneration of petroleum cracking catalysts containing from 3% to 10% by volume of carbon monoxide and having a latent heat content ranging from 8 to 25 B.t.u. per standard cubic foot and having a temperature prior to the addition of air required for oxidation of its combustibles content of from 900° F. to 1150° F.

7. A method for burning a combustibles-containing waste gas stream having an auto-oxidation temperature substantially higher than the temperature of said stream and having a combustible content sufficient when oxidized to raise the temperature of said stream substantially above said auto-oxidation temperature, comprising the steps of dividing said waste gas into a plurality of streams, passing the first of said streams into a first combustion zone and therein passing said stream through a bed of oxidation catalyst so as thereby to effect catalytic oxidation of its combustible content and thus increase its temperature substantially above said auto-oxidation temperature, passing the thus heated first stream through a plurality of additional combustion zones, successively adding to said first stream in each additional combustion zone an additional stream of said waste gas, and adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

8. A method in accordance with claim 7 in which said first stream comprises from 20% to 45% of the total stream.

9. A method for burning a combustibles-containing waste gas stream having an auto-oxidation temperature substantially higher than the temperature of said stream and having a combustible content sufficient when oxidized to raise the temperature of said stream substantially above said auto-oxidation temperature, comprising the steps of dividing said waste gas into a plurality of streams, passing the first of said streams comprising from 20% to 45% of the total stream into a first combustion zone and therein passing said stream through a bed of oxidation catalyst so as thereby to effect catalytic oxidation of its combustible content and thus increase its temperature substantially above said auto-oxidation temperature, passing the thus heated first stream successively through a plurality of additional combustion zones, successively adding to said first stream in each of said additional combustion zones an additional stream of said waste gas, progressively increasing the proportion of waste gas added in each successive zone while at the same time adjusting in each zone the proportions of the newly added relatively cool waste gas to the relatively high temperature gas entering from the preceding combustion zone such that the temperature of the mixture in each of said zones before oxidation of the combustible content of the newly added stream lies above the auto-oxidation temperature of the mixture whereby oxidation of the combustible content of said newly added stream takes place raising the temperature of the mixture above its auto-oxidation temperature before said mixture passes into the next successive zone.

10. A method for burning a combustibles-containing waste gas stream having an auto-oxidation temperature substantially higher than the temperature of said stream and having a combustible content sufficient when oxidized to raise the temperature of said stream substantially above said auto-oxidation temperature, said stream containing an insufficient concentration of oxygen for oxidation of the combustible content thereof, comprising the steps of dividing said waste gas into a plurality of streams and passing said streams into a plurality of combustion zones, homogeneously mixing sufficient air with said waste gas before introduction thereof into said combustion zones to supply the oxygen required for oxidation of said combustibles, passing the first of said streams into a first combustion zone and therein passing said stream through a bed of oxidation catalyst so as thereby to effect catalytic oxidation of its combustible content and thus increase its temperature substantially above said auto-oxidation temperature, passing the thus heated first stream successively through a plurality of additional combustion zones, successively adding to said first stream in each additional combustion zone an additional stream of said waste gas, and adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

11. A method for burning a combustibles-containing waste gas stream having an auto-oxidation temperature substantially higher than the temperature of said stream and having a combustible content sufficient when oxidized to raise the temperature of said stream substantially above said auto-oxidation temperature, comprising the steps of dividing said waste gas into a plurality of streams, passing the first of said streams at a temperature of not less than 500° F. into a first combustion zone and therein passing said stream through a bed of oxidation catalyst so as thereby to effect catalytic oxidation of its combustible content and thus increase its temperature substantially above said auto-oxidation temperature, maintaining the maximum temperature in said first zone below 1700° F., passing the thus heated first stream successively through a plurality of additional combustion zones, successively adding to said first stream in each additional combustion zone an additional stream of said waste gas, and adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

12. A method in accordance with claim 7 in which the combustible content of said waste gas is comprised principally of carbon monoxide.

13. A method in accordance with claim 7 in which said waste gas comprises effluent gases resulting from regeneration of petroleum cracking catalysts containing from 3% to 10% by volume of carbon monoxide and having a latent heat content ranging from 8 to 25 B.t.u. per standard cubic foot and having a temperature prior to the addition of air required for oxidation of its combustible content of from 900° to 1150° F.

14. A method for burning a waste gas stream comprising effluent gas resulting from the regeneration of petroleum cracking catalysts containing from 3% to 10% by volume of carbon monoxide and having a latent heat content ranging from 8 to 25 B.t.u. per standard cubic foot and having a temperature prior to the addition of air required for oxidation of its combustible content of from 900 to 1150° F. and containing insufficient oxygen to supply that required for oxidation of its combustible constituents, comprising the steps of dividing said waste gas into a plurality of streams and passing said streams into a plurality of combustion zones, homogeneously mixing sufficient air with said waste gas before introduction thereof into said combustion zones to supply oxygen required for oxidation of said combustibles and passing the first of said streams comprising from 20% to 45% of the total stream into a first combustion zone and therein passing said stream through a bed of oxidation catalyst so as thereby to effect catalytic oxidation of its combustible content and thus increase its temperature substantially above said auto-oxidation temperature, maintaining the maximum temperature in said first zone below 1700° F., and passing the thus heated first stream successively through a plurality of additional combustion zones, successively adding to said first stream in each of said additional combustion zones an additional stream of said waste gas, progressively increasing the proportion of waste gas added in each successive zone while at the same time adjusting in each zone the proportions of the newly added relatively cool waste gas to the relatively high temperature gas entering from the preceding combustion zone such that the temperature of the mixture in each zone before oxidation of the combustible content of the newly added stream lies above the auto-oxidation temperature of the mixture whereby oxidation of the combustible content of said newly added stream takes place raising the temperature of the mixture substantially above its auto-oxidation temperature before said mixture passes into the next successive zone.

References Cited in the file of this patent

UNITED STATES PATENTS

| | | |
|---|---|---|
| 1,756,897 | Bilsky | Apr. 29, 1930 |
| 1,787,795 | Porter | Jan. 6, 1931 |
| 2,143,820 | Payn | Jan. 10, 1939 |
| 2,520,717 | Hagerbaumer | Aug. 29, 1950 |
| 2,634,232 | Houdry | Apr. 7, 1953 |
| 2,658,742 | Suter | Nov. 10, 1953 |
| 2,672,402 | Stokes | Mar. 16, 1954 |
| 2,674,521 | Houdry | Apr. 6, 1954 |
| 2,718,460 | Bowen | Sept. 20, 1955 |
| 2,753,925 | Campbell | July 10, 1956 |
| 2,764,969 | Weiss | Oct. 2, 1956 |
| 2,829,731 | Clayton | Apr. 8, 1958 |
| 2,840,043 | Durham | June 24, 1958 |

FOREIGN PATENTS

| | | |
|---|---|---|
| 827,384 | Germany | Jan. 10, 1952 |
| 698,939 | Great Britain | Oct. 28, 1953 |